United States Patent [19]
Orendi

[11] 3,938,418
[45] Feb. 17, 1976

[54] CIRCULAR SAW BLADE

[75] Inventor: Roderich Orendi, Sondelfingen, Germany

[73] Assignee: Gustav Wagner Maschinenfabrik, Reutlinger, Germany

[22] Filed: Dec. 6, 1974

[21] Appl. No.: 530,370

[30] Foreign Application Priority Data
Dec. 14, 1973 Germany............................ 2362319

[52] U.S. Cl................................... 83/839; 83/676
[51] Int. Cl.². ..................... B27B 33/08; B27B 33/12
[58] Field of Search ............ 83/835, 838, 848, 849, 83/839, 676; 76/101 R, 101 A, 112

[56] References Cited
UNITED STATES PATENTS
3,812,755   5/1974   Danielsen ............................ 83/835
FOREIGN PATENTS OR APPLICATIONS
495,695   5/1950   Belgium ................................ 83/838

Primary Examiner—Willie G. Abercrombie
Attorney, Agent, or Firm—Wolfgang G. Fasse; Willard W. Roberts

[57] ABSTRACT

This circular saw blade has a center disk and circumferential teeth segments secured to the center disk, for example, by welding. The center disk has two rows of circumferentially spaced radially outwardly extending lands. The two rows of lands are preferably axially spaced from each other by a circumferential groove. The lands in each row are circumferentially spaced by gaps, whereby the lands in one row are angularly displaced relative to the lands in the other row so that the lands in one row face the gaps in the other row. The teeth segments are provided with the same type of lands and gaps, but facing radially inwardly, whereby the lands contacting each other on both sides of the disk may be electronically welded from one side of the disk. Worn out segments may be easily removed by a cutting or grinding tool having an outer diameter somewhat smaller than the distance from one outer wall of a gap to the outer wall of the next adjacent gap.

6 Claims, 5 Drawing Figures

CIRCULAR SAW BLADE

BACKGROUND OF THE INVENTION:

The present invention relates to circular saw blades and to methods for making and repairing such blades. More specifically, the invention relates to circular saw blades used in so called cold sawing machines for steel and non-ferrous metals. These sawing blades conventionally comprise a center disk made of cheaper material and teeth segments, hereafter simply referred to as segments. These segments are made of high alloy and hardened material removably secured to the center disk in such a manner that individual segments, which have been damaged or all segments which have been worn out may be replaced without limiting in any way the reuse of the center disk.

One quite well known and widely used releasable interconnection between the disk and the segments is produced by milling about ⅓ off along the circumference on both sides of the center disks so that a circumferentially extending center ridge is produced having a width corresponding to about ⅓ of the thickness of the disk. The radial width of the center ridge may, for example, be about 15 mm. A groove is machined into the inner edge of the segments to receive the center ridge of the disk. The reverse construction of the interconnection between the segments and the disk is also known. In other words, the center disk is provided with a circumferentially extending center groove instead of a ridge and the segments are provided with such a ridge fitting into the groove of the disk. In any event, the overlapping portions of the segments and disk are provided with holes, and rivets extend through these holes, whereby the rivet heads are countersunk on both sides of the saw blade. For example, the countersunk holes may have an opening angle of about 90°. Depending on the type of construction, the countersunk holes may be provided in the segments or in the disk. It is further known to precisely hold the segments in the plane of the disk by means of rivets extending through respective holes located where two adjacent segments abut each other. In other words, these holes extend partially through each of the two adjacent segments and this applies also to the countersunk holes. In order to replace individual segments or to remove all segments, it is necessary to punch-out the rivets.

The just described interconnection between disk and segments is rather expensive. Additionally, it is necessary that the holes through the disk along its circumference and the holes in the segments are rather precisely spaced in order to assure the necessary alignment and proper positioning of the segments.

In order to obviate the need for such rivet holes, especially in connection with so called discard saw blades attempts have been made to weld the segments to the disks either electrically or autogenously. However, difficulties have been encountered in connection with such welding attempts due to the fact that the segments expand especially in their longitudinal plane due to the welding heat. As a result, the end of a segment partially welded to the disk gaps away from the disk, thus making it difficult or impossible to properly complete the welding. This gapping away of the segments from the disk is in the plane of the disk. In addition, the welding heat causes tension forces at the welding location. These tension forces tend to bend the end of the segment not yet welded out of the plane of the disk toward the welding apparatus.

The just described difficulties have been reduced to some extent by welding the segments to the disk by means of an electron beam, whereby a substantially smaller heating zone is created. However, even such smaller heating zones do not entirely remove the difficulties of the bending of the segments.

It is well known that the tilting angle, that is, the angle between the bent end of the segment and the plane of the disk and the angle between the bent up end of the segment and the tangent to the circumference of the disk will depend in their size on the thickness of the two elements to be welded toghether. Such thickness in turn determines the energy necessary for the welding. As a result, the degree of bending out of the plane of the saw blade and also the degree of the bending radially outwardly will increase if the thickness of the elements to be welded together increases. To alleviate these problems it has been suggested, especially in connection with an electrical welding process to provide a circumferential centrally located groove in the disk, as well as in the segments, so that only respective circumferentially extending lands to the right and left are provided in the disk as well as in the segments. After the welding the grooves form a circumferentially hollow ring space in the finished saw blade. The purpose of these inner grooves is to reduce the material thickness at the welding location and thus to also reduce the above described bending of these segments. However, even this method leaves room for improvement.

Thus, it would be possible, especially in connection with a welding apparatus employing one electron beam on each side of the saw blade to perform the welding operation on both sides of the saw blade simultaneously, whereby the forces which cause the above bending would compensate each other. In this manner the segments would remain in the plane of the center disk. However, such an apparatus is rather expensive. Similarly, it would be possible to perform repeated welding steps simultaneously on both sides of the saw blade in order to reduce the applied welding energy. As mentioned, such machines capable of welding on both sides simultaneously either continuously or in sequential steps are rather expensive, in any event substantially more expensive than a welding apparatus capable of welding on but one side of the disk at a time. Besides, it has been found that the simultaneous application of welding beams from both sides of the saw blade results in an undesirable interfering between the two welding beams, since the beams penetrate respectively into the opposite land.

OBJECTS OF THE INVENTION

In view of the above, it is the aim of the invention to achieve the following objects singly or in combination:

to provide a saw blade of the type described above in which the segments may be welded to the center disk by means of a single electron beam in an inexpensive manner, while simultaneously avoiding the above described difficulties;

to construct a saw blade in such a manner that the segments may be welded to the disk sequentially once on one side of the blade and then substantially on the other side of the blade by means of the same electron beam, which is to remain on one side of the blade and without the need for turning the blade around;

to assure that the segements will remain precisely aligned in the plane of the disk without bending or warping, by precisely controlling the quantity of the welding energy on both sides of the disk in rather narrow welding zones;

to divide the lands and gaps around the circumference of the disk and segments in such a manner that the number of gaps and lands of one segment will correspond to the respective number of any other segment, whereby these segments are not limited to any particular position along the circumference of the disk; and to provide a method for repairing the present saw blades in a simple manner by simply cutting the interconnecting lands either preferably sequentially by means of rotating cutting tools such as disks having an outer diameter such that only one land at a time can be severed by one cutting disk.

SUMMARY OF THE INVENTION:

According to the invention there is provided a circular saw blade, especially for use in connection with so called cold sawing machines for steel and non-ferrous metals. The present saw blade comprises a center disk made of cheaper material and a plurality of teeth segments welded to the circumference of the disk by means of an electron beam. The teeth segments are made of high alloyed hardened material. Preferably, a centrally located groove is provided prior to the welding in the segments, said groove extending radially outwardly. Similarly, a groove is provided in the circumference of the disk, said groove extending radially inwardly. The axial width of each groove will, for example, be ⅓ of the blade thickness, so that on each side of the groove a flange will extend around the circumference of the disk, as well as along the inner circumference of the segments. The radial depth of these grooves will preferably be slightly larger than the width of the electron beam used for the welding. Further, according to the invention, the flanges in the disk and in the segments will be provided with gaps, for example, by a milling operation, whereby the gaps separate adjacent lands preferably in such a manner that the circumferential width of the gaps is wider than the respective width of the lands, both in the disk and in the segments. The lands in one flange are angularly displaced relative to the lands in one flange register with the gaps in the opposite flange and vice versa. This angular displacement is the same in the segments and in the disk. Due to this angular displacement and since the gaps are preferably wider in the circumferential direction than the lands, it is possible for the electron beam to reach the lands on the opposite side of the saw blade along the entire circumferential width of these lands.

According to the invention the just described circular saw blades are manufactured by first aligning the lands of the disk with the lands of a segment and securing the two elements in a chuck or vise in such a manner that the segments cannot tilt. Thereafter an electron beam is directed from one side only onto the successive welding zones, whereby alternatively the lands are welded on both sides of the saw blade. Upon completion of one welding sequence around the saw blade the latter may be removed from the chuck or vise with the segments welded thereto, whereby the segments are precisely aligned with the plane of the center disk of the saw blade due to the fact that only narrow zones along both sides of the saw blade have been welded in successive steps, whereby an equal welding energy was employed in each step.

According to the invention there is further provided a method for repairing damaged segments or replacing worn out segments. This is accomplished by severing the lands interconnecting the disk and the segments individually by means of a cutting tool such as a disk having such an outer diameter that it will sever one land at a time. Preferably the outer diameter of the severing disk will correspond to at least the circumferential width of a land and to not more than the circumferential width of two gaps and the respective land therebetween. Thus, the severing disk will penetrate at the most merely into the adjacent gaps.

BRIEF FIGURE DESCRIPTION:

In order that the invention may be clearly understood, it will now be described, by way of example, with reference to the accompanying drawings, wherein.

Figure 1:
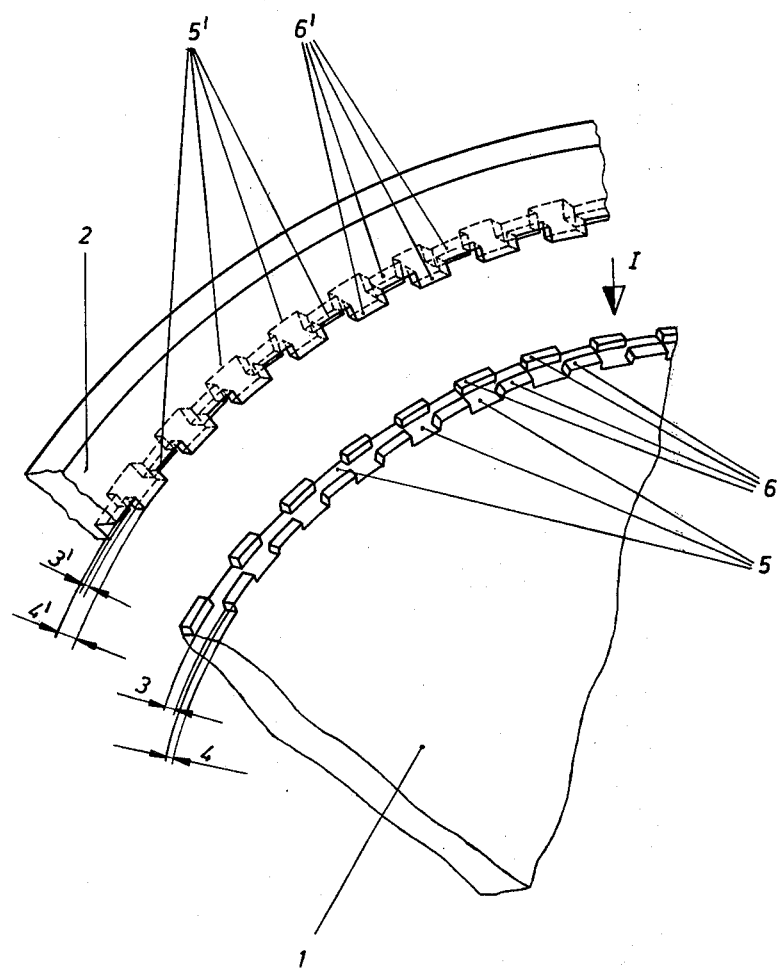
FIG. 1 is a perspective view of a sector of the center disk and of a segment prior to their radial alignment relative to each other and prior to the welding by means of an electron beam.
Figure 4:
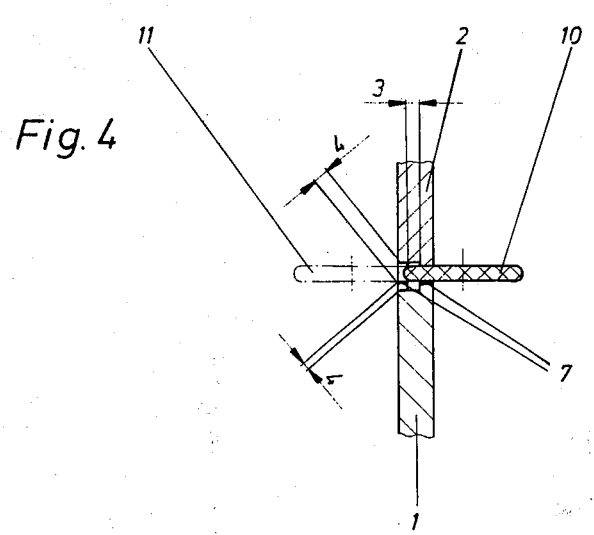
FIG. 4 is a partial sectional view through the saw blade along sectional line III—III in FIG. 3.

DETAILED DESCRIPTION OF EXAMPLE EMBODIMENTS:

FIG. 1 illustrates a sector of the center disk 1 and a teeth segment 2 located in the same plane as the disk 1 but radially spaced therefrom for illustration purposes. Preferably, the outer circumference of the disk 1 is provided with a central groove having an axial width 3 and a radial depth 4 as best seen in FIG. 4. Similarly, the segment 2, which is not yet provided with the saw teeth has machined therein along its inner circumference facing the outer circumference of the disk 1 a central groove also having an axial width 3' and a radial depth 4'. Preferably, the radial depth 4' is somewhat larger than the radial depth 4, which may facilitate the severing operation. The outer circumference of the disk 1 is provided in a milling operation with gaps 5, whereby rows of first and second lands 6 are produced. Similarly, the inner circumference of the segment 2 is machined or milled to provide gaps 5', which in turn separate rows of third and fourth lands 6'. Preferably, the circumferential width of the gaps 5 and 5' is somewhat wider than the circumferential width of the respective lands 6 and 6', whereby an electron beam arranged on one side of the disk only may reach a welding interface along the opposite lands along the entire circumferential width of such opposite lands. For example, the circumferential grooves in the disk 1 and in the segment 2 may be produced by so called groove cutters. Prior to the welding the segments and disk are aligned relative to each other so that the lands 6 and 6' in each row are axially aligned to contact each other.

Figure 2:
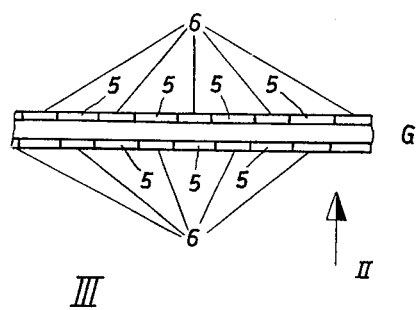
FIG. 2 is a top view onto the developed circumferential surface of the segment illustrated in FIG. 1 and in the direction of the arrow I in FIG. 1.

FIG. 2 illustrates the developed circumferential surface of the disk 1 showing the axial alignment of the gaps 5 with the lands 6 as well as the groove G having the axial width 3 and the radial depth 4. The view of FIG. 2 incidentally is a view in the direction of arrow I in FIG. 1.

Figure 3:
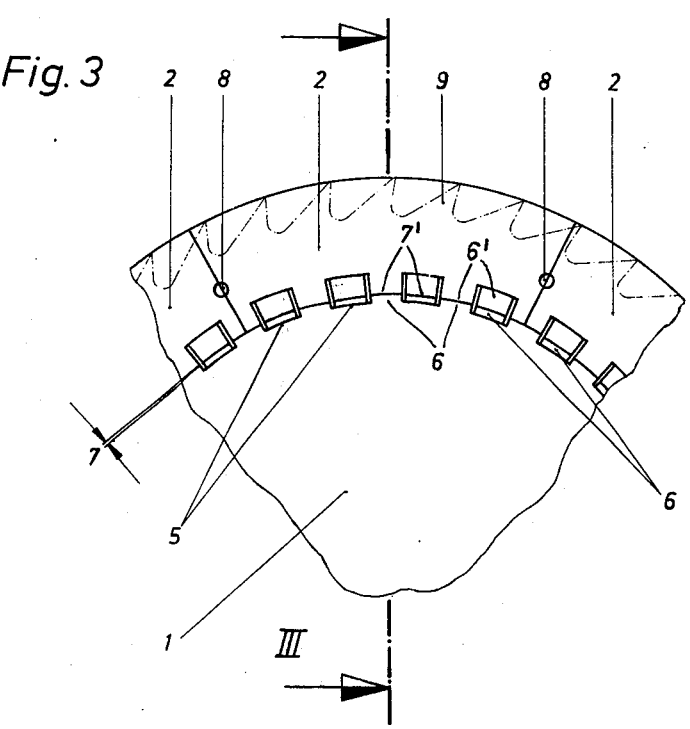
FIG. 3 is a side view of a sector of the saw blade after the welding as viewed in the direction of the arrow II in FIG. 1 and prior to the grinding of the saw teeth.

FIG. 3 illustrates a side view in the direction of the arrow II in FIG. 2. The sector of FIG. 3 shows the segments 2 welded to the disk 1, whereby the welding seams 7' along the interface between radially aligned lands 6, 6' have a width 7. As in FIG. 2, FIG. 3 also makes it clear that the gaps 5 are wider in the circumferential direction than the lands 6.

In order to further secure the segments 2 relative to each other, and in the plane of the disk 1 there are provided rivets 8 located at the radial planes where two adjacent segments abut each other. The sawteeth 9 are shown by dash-dotted lines since these saw teeth will be produced in a subsequent grinding operation.

Figure 5:
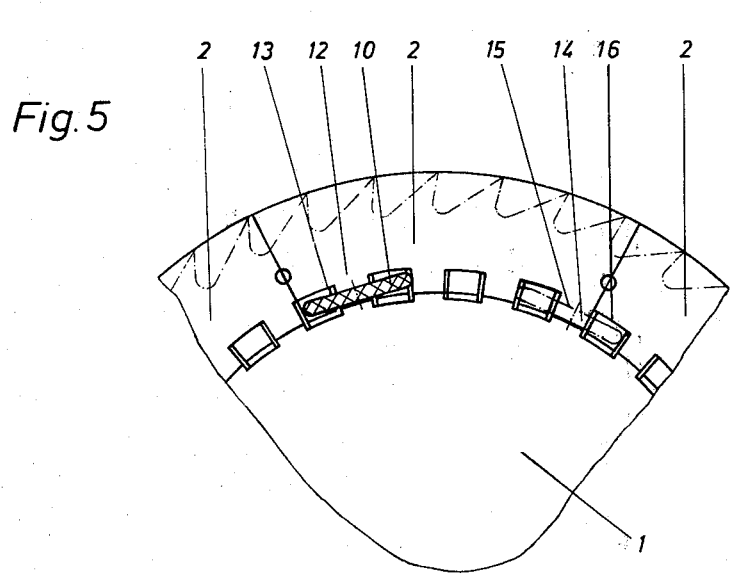
FIG. 5 is a side view similar to that of FIG. 3, and illustrating additionally the severing tool for severing the lands interconnecting the disk and the segments.

FIG. 4 illustrates a preferred method for repairing the saw blades according to the invention, whereby FIG. 4 is a sectional view along the lines III—III in FIG. 3. Two severing disks or cutting grinders 10 and 11 are employed, one on each side. The cutters 10 and 11 are located so that the cutting plane will extend somewhat radially outwardly or above the welding seam 7'. These cutting disks 10, 11 have a diameter ranging from at least the circumferential width of the lands to the circumferential width of two gaps and a land therebetween so that one land will be severed at a time. These cutters 10, 11 may be rotated around the center of the disk 1 so as to sequentially cut one land after the other. Basically, it does not make any difference whether one or two cutters are employed. However, if two cutters are employed, one on each side, these cutters will be somewhat angularly displaced relative to each other, as illustrated in FIGS. 3 and 5, so that each cutter may penetrate to a predetermined depth for the complete severing of a land. If only one cutter is employed, the saw blade will be turned around after the cutter has completed one circle, whereupon the cutter will again make one revolution around the center of the disk 1 for severing the lands on the opposite side of the saw blade.

In view of the above description of the severing by means of the cutters 10 and/or 11 it will be appreciated that these cutters will completely penetrate into the adjacent gap. Thus, it is immaterial whether the adjacent gap is the last gap of the segment to be severed or the first gap of the segment remaining. It will be appreciated that in this manner all segments may be severed by the described rotation of the cutter 10, 11 around the center of the disk 1. After the severing, the remaining land portions may be subjected to a grinding operation in order to provide again the original diameter of the center disk for the subsequent welding of one or more segments to the disk as described above. Thus, the original diameter may be reproduced by the grinding operation along one segment or all around the center disk.

FIG. 5 illustrates a side view with the cutter in two different angular positions. Thus, the cutter 10 will penetrate into the gap 13 after severing the land 12. Gap 13 is in the range of the segment 2 to be removed. On the other hand, when the cutter 10 has reached the position 14 shown in dash-dotted lines in FIG. 5, the cutter will penetrate into the gap 16 within the range of the next adjacent segment when the land 15 has been severed.

Although the invention has been described with reference to specific example embodiments, it is to be understood, that it is intended to cover all modifications and equivalents within the scope of the appended claims.

I claim:

1. In a circular saw blade having a center disk with a circumference and a plurality of teeth segments with radially inwardly facing edges secured to said circumference of the center disk, the improvement comprising two rows of first and second lands extending along the circumference of the center disk and two similar rows of third and fourth lands extending along the inwardly facing edges of said teeth segments, gaps between adjacent lands in each of the rows, whereby the lands are circumferentially spaced from each other, said first lands axially registering with the gaps between the second lands and vice versa, said third lands axially registering with the gaps between the fourth lands and vice versa, said first and second lands radially registering along common interfaces with the third and fourth lands, and welding seams between the lands on the center disk and the lands on the teeth segments.

2. The circular saw blade according to claim 1, wherein each of said gaps is defined by a bottom surface and the adjacent lands, said saw blade further comprising a first circumferential groove in the center disk between the rows of the first and second lands, said first groove having a width for axially spacing the first and second lands from each other, said first groove having a radial depth to reach somewhat below the bottom surfaces of the respective gaps, a second groove in said radially inwardly facing edges of said teeth segments, said second groove facing said first circumferential groove and having said width for axially spacing the third and fourth lands from each other, said second groove having a radial depth to reach somewhat below the bottom surfaces of the corresponding gaps.

3. The circular saw blade according to claim 2, having a given thickness, said width of the first and second grooves corresponding to about one third of said given thickness, and said lands having in each row an axial thickness also corresponding to about one third of said given thickness.

4. The circular saw blade according to claim 1, wherein the gaps and said lands each have a respective circumferential width whereby the circumferential width of the gaps is somewhat wider than that of the lands to provide full access for an electronic welding beam.

5. The circular saw blade according to claim 1, further comprising fastening means between adjacent teeth segments.

6. The circular saw blade according to claim 5, wherein said fastening means comprise countersunk heat rivets.

* * * * *